United States Patent

Mercer et al.

[15] 3,648,379

[45] Mar. 14, 1972

[54] CONTINUOUS FREEZE DRYING SYSTEM

[72] Inventors: James L. Mercer, Los Altos, Calif.; Lorne A. Rowell, Lachine, Quebec, Canada

[73] Assignee: John T. Horton, Hinsdale, Ill.

[22] Filed: Mar. 16, 1970

[21] Appl. No.: 19,917

[52] U.S. Cl. .......................................... 34/5, 34/92, 99/71
[51] Int. Cl. .......................................................... F26b 5/06
[58] Field of Search ................. 34/5, 15, 92; 99/71; 62/282

[56] References Cited

UNITED STATES PATENTS

| | | | |
|---|---|---|---|
| 3,293,766 | 12/1966 | Togashi et al. | 34/92 X |
| 3,253,420 | 5/1966 | De George | 99/71 X |
| 3,408,919 | 11/1968 | Guggenheim | 34/5 X |
| 3,513,559 | 5/1970 | Eilenberg | 34/92 X |
| 3,243,892 | 4/1966 | Ullrich et al. | 34/5 X |
| 3,247,600 | 4/1966 | Togashi et al. | 34/92 X |
| 3,541,805 | 11/1970 | Kumar et al. | 34/92 X |

FOREIGN PATENTS OR APPLICATIONS

555,000  3/1958  Canada..........................34/5

Primary Examiner—Charles Sukalo
Assistant Examiner—W. C. Anderson
Attorney—Flehr, Hohbach, Test, Albritton & Herbert

[57] ABSTRACT

A system of apparatus (and method) for the continuous freezing and freeze drying of solids-containing aqueous liquids to obtain a freeze dried product. The feed liquid is frozen as a thin sheet on a continuously moving belt and is broken to form discrete pieces which are further reduced in size prior to freeze drying. The frozen particles are moved on a chilled multistage vibratory conveyor in an evacuated chamber wherein refrigerated condensers and radiant energy sources cooperate with the conveyor to sublimate the ice content of the frozen particles to form a freeze dried product. The vibrating conveyor is constructed to minimize transfer of vibratory forces as well as the effects of changes in length of the conveying sections as a result of temperature change. The system operates continuously to receive the liquid feed, to discharge the freeze dried product, and to separate and remove ice collecting on the condensers. The system functions to accomplish the freezing and freeze drying operations in the relatively short period of from 40 to 110 minutes.

15 Claims, 17 Drawing Figures

Fig. 1

INVENTORS
James L. Mercer
Lorne A. Rowell
BY Flehr, Hohbach, Test,
Albritton & Herbert
Attorneys

PATENTED MAR 14 1972

INVENTORS
James L. Mercer
BY Lorne A. Rowell
Flehr, Hohbach, Test,
Albritton & Herbert
Attorneys

CONTINUOUS FREEZE DRYING SYSTEM

BACKGROUND OF THE INVENTION

The dehydration of solids-containing aqueous liquids or semiliquid materials by the technique known as "freeze drying" has many advantages, the most notable of which is the ability of the material being dried to retain its original properties. The dried material is easily handled, packaged and stored, without loss of desired properties, following which it may be easily reconstituted upon the addition of water. A truly successful freeze drying procedure for liquid foods such as coffee, tea, orange juice and like fruit juices, milk and semiliquid foods is therefore highly to be desired. There is also much demand for satisfactory procedures to freeze dry such biological substances as blood, egg albumen, blood plasma, sera and various biologically active materials. There is a particular demand for successful freeze drying techniques which may be carried out by continuous procedures and systems of apparatus, in a relatively short period of time.

SUMMARY OF THE INVENTION AND OBJECTS

This invention relates to a method and system of apparatus for the continuous freezing and freeze drying of solids containing aqueous liquids of all types. It particularly relates to improvements on the concepts described in U.S. Pat. Nos. 3,293,766 and 3,247,600.

In accordance with the present invention, a solids-containing aqueous liquid is continuously and rapidly frozen as a thin sheet of frozen material, following which the thin sheet of frozen material is broken and reduced in size to form discrete particles of frozen material which may be readily freeze dried. The particles of frozen material are continuously conveyed along a vibrating pathway in an evacuated substantially air-free chamber in proximity to refrigerated condenser means and a source of radiant energy which cooperate to sublimate the ice content of the frozen particles. In accordance with the invention, the vibratory pathway is cooled while it is being vibrated at its natural frequency, both operations being carried out in such fashion that there is a minimum interference with the processing conditions or the functioning of the apparatus as a result of the vibration or changes in dimension due to temperature. The apparatus also functions to maintain essential internal processing conditions to retain the desired particulate form of the material being freeze dried, that is, during the continuous processing of feeding the frozen material, continuously removing freeze dried product and periodically separating and removing the ice as it is continuously sublimated from the product.

In general it is an object of the present invention to provide an improved system of apparatus and method whereby solids containing aqueous liquids can be continuously frozen, and thereafter freeze dried, in a rapid, efficient manner.

Another object of the invention is to provide a system of apparatus and method of such character whereby optimum product characteristics are developed in a novel manner.

Another object of the invention is to provide an improved system of apparatus and method whereby solids-containing aqueous liquids can be continuously freeze dried to obtain desired product characteristics in a substantially reduced period of time.

A still further object of the invention is to provide an improved continuous method and system of apparatus by which liquid foods, biological substances and the like can be freeze dried to produce dried products of improved quality, equivalent in characteristics to the starting material.

Another object of the invention is to provide improved novel compositions of matter obtained by the system of apparatus and method of the present invention.

Further objects and features of the invention will appear from the following description in which the preferred embodiments have been set forth in detail in conjunction with the accompanying drawing.

DESCRIPTION OF THE PREFERRED EMBODIMENT

Figure 1:
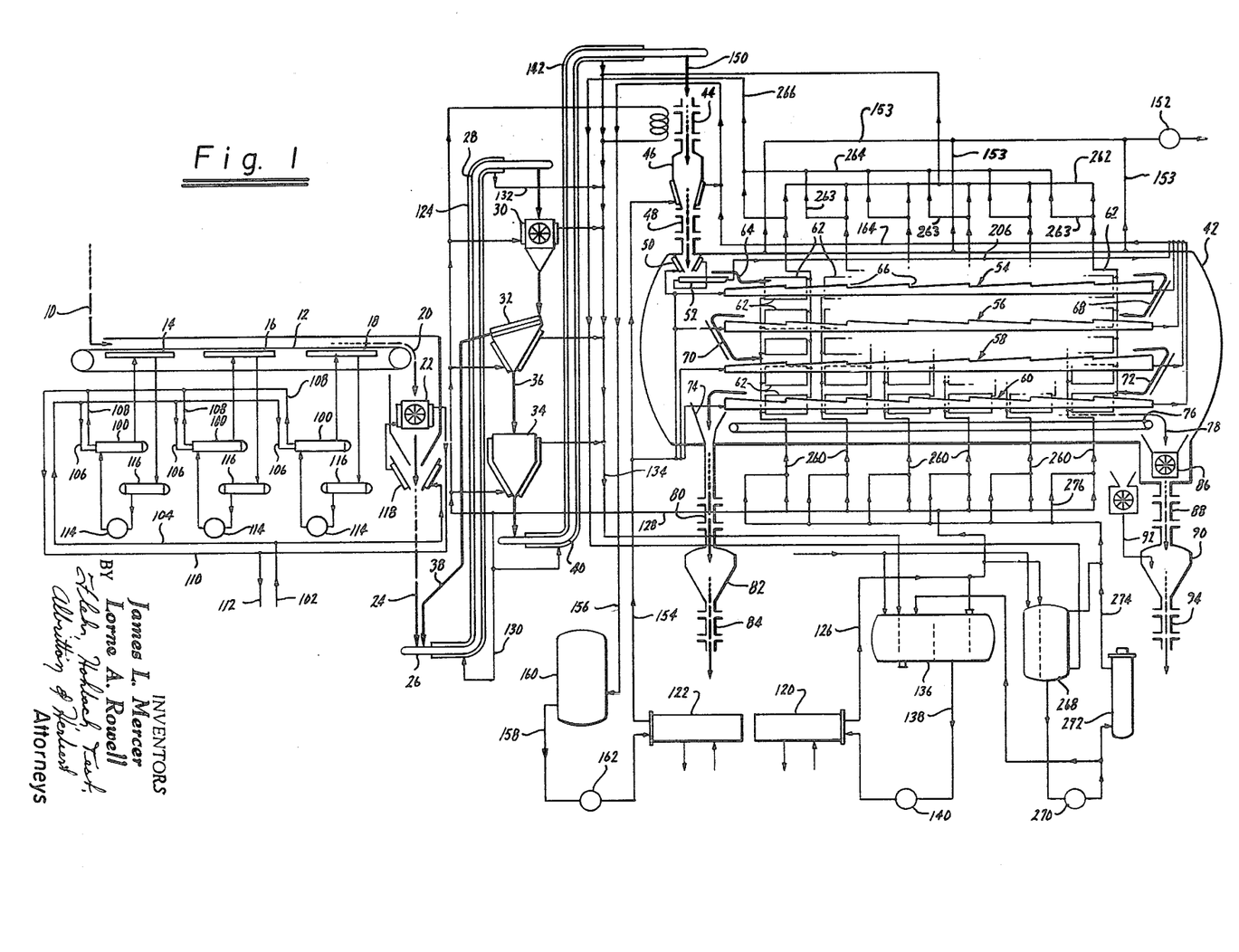
FIG. 1 is a schematic representation of a system of apparatus which may be used in carrying out the continuous method, according to the present invention.

Referring to FIG. 1, the liquid to be freeze dried, such as an aqueous extract of coffee, is introduced at 10 to a continuously moving contact freezer represented by the endless belt 12. The liquid is chilled and frozen as a thin continuous layer on the surface of the belt by circulation of a refrigerant liquid into contact with the bottom of the belt, for example, by trough or spray means 14, 16 and 18. The resulting continuous layer of frozen material fractures and falls off the end of the belt (arrow 20) into a breaker mechanism 22 where the fractured pieces of frozen material are reduced in size for further conveyance in the system. The broken pieces of frozen material subsequently pass into a conveyor mechanism 26, as represented by the arrow 24. The conveyor 26 is chilled by refrigerated jacket means 28, and functions to convey the frozen feed material in the form of discrete individual pieces to comminuting means 30, where the individual pieces are further reduced in size to produce individual particles generally of a size less than about four mesh. The particles leaving the comminutor 30 are subjected to classification in the screening device 32 so that only particles of a size less than about four mesh pass to the refrigerated hopper 34, as represented by the arrow 36. Oversized particles, that is, greater than about four mesh, are recycled to the inlet of the conveyor 26 (arrow 38) for further processing and reduction in size in the comminutor 30. Appropriately sized particles in the hopper 34 pass to a second refrigerated conveyor 40 which leads to the freeze drying operation.

As schematically represented in FIG. 1, the freeze drying is carried out in an evacuated substantially air-free chamber 42. To maintain desired conditions within the chamber, frozen particles discharged from the conveyor 40 initially pass through a first vapor lock 44 to a refrigerated feed hopper 46. Thereafter, at appropriate intervals, the frozen material is fed through a second vapor lock 48 to an internal feed hopper 50, within the drying chamber 42, from which the frozen particles are fed to a controllable vibrating feeder 52 at a regulated, uniform rate to vibratory conveyor means within the freeze drying chamber. As illustrated, the vibratory conveyor means comprises a series of vertically spaced vibrated conveying decks 54, 56, 58 and 60, hereinafter more fully described. In accordance with the invention, the individual conveying decks are cooled to maintain desired characteristics of the particles as they are freeze dried, while the particles are simultaneously subjected to radiant energy to sublimate the ice content to vapor form. As also hereinafter described, the vibratory conveyor means is bounded on each side by a series of condensers schematically represented at 62, which are maintained at a suitably low temperature (i.e., −50° to −100° F.) by suitable refrigerating media such as liquid cryogens. In general, the condensers function as high-speed pumps and maintain a low pressure by causing water vapor and other condensable gases to condense and freeze on the cold surfaces of the condenser plate.

In the schematic illustration of FIG. 1, the frozen particles fed to the top conveying deck (arrow 64) move with a bouncing or "dancing" motion to the right of the chamber, and are periodically rotated and turned over by the vibrating action of the conveyor and also by steps 66 provided at spaced positions on the upper conveyor surface. Upon reaching the end of the conveyor 54, the particles fall and are deflected onto the subadjacent conveying deck 56 (arrow 68) where the conveying action is repeated until, upon reaching the end of the conveying deck 56, the particles again fall and are deflected onto the deck 58 below (arrow 70). The particles continue along the vibrating pathway provided by the deck 58 until they fall again (arrow 72) to the subadjacent conveyor 60, where the vibrating conveyance is repeated until the particles eventually fall into the product hopper 74. Throughout the progression along the vibrating pathway of the conveyors 54, 56, 58 and 60, the ice content of the frozen particles is effectively sublimated and removed by transfer to the condenser plates 62. The latter are periodically deiced by surges of warm refrigerating means with the result that the ice falls to the bottom of the chamber where it is collected on a belt conveyor 76 for removal from the system (arrow 78).

The removal of a freeze dried product, and the separated ice, is affected by means which maintain the desired freeze drying conditions with the chamber 42, and without upsetting the equilibrium of the system. Thus the dried product in hopper 74 can be fed through a first vapor lock 80 to a collection hopper 82, from whence it may be discharged through a second vapor lock 84 to dump bins, drums or other suitable means for collecting or storing the product. In like fashion, the ice periodically separated from the condensers, after first being reduced in size in the breaker means 86, passes through a first vapor lock 88 to a collection hopper 90. In a preferred embodiment, the ice in the hopper 90 is melted by contact at atmospheric pressure with hot water or other suitable liquid introduced through the line 92, and is discharged through a further vapor lock 94 as a liquid waste.

It will be appreciated that the foregoing presents a generalized description of the processing, and of the apparatus used in carrying out the processing. The particular system of apparatus for carrying out the processing, as well as the steps in the processing, are hereinafter described in detail.

FREEZING

As generally noted above, the entering liquid is frozen on a continuously moving contact surface to form a thin layer of frozen material. As best illustrated in FIG. 1, the contact freezing operation is divided into separate stages by the separate freezing units 14, 16 and 18. The endless belt 12, which may be a continuous stainless steel band moves above the separate freezing units at a very slow rate so that the entering liquid feed is in contact with the belt for a period of approximately 8 to 12 minutes. As a consequence, the belt is in close proximity to the separate freezing means 14, 16 and 18 for substantially equal periods of time, each representing about one-third of the total period of freezing contact with the belt.

As further illustrated in FIG. 1, the liquid refrigerant circulated to the freezing units (e.g., trichlorethylene or other suitable refrigerant) is maintained at a desired low temperature by means of heat exchange units 100. Within the units 100, the circulating refrigerant is cooled by heat exchange with a circulating refrigerant brine (e.g., freon) entering the system at 102. Thus, each of the heat exchange units 100 is supplied with a refrigerant brine through the line 104 and branch lines 106, with the brine being returned to its low temperature source through the lines 108, 110 and 112 to effect a chilling contact of the refrigerant with the bottom of the belt 12 (e.g., by spraying). Each of the freezing units 14, 16 and 18 is separately provided with a pump 114 which circulates the contact refrigerant through a heat exchanger unit 100 to the freezing unit. The refrigerant is then collected within the individual freezing unit and returned to the storage tank 116 for recycle through the heat exchange unit 100, in a continuous cycle. However, in accordance with the present invention, the degree of heat exchange within the heat exchange units 100 is controllable so that the temperature of the refrigerant brought into contact with the underside of the belt 12 by the units 14 and 16 is somewhat higher than the temperature of the refrigerant brought into contact with the belt by the unit 18. By way of illustration, trichlorethylene can be circulated to the units 14 and 16 at a temperature of the order of −25° to +10° F., simultaneously with circulation of the trichlorethylene to the unit 18 at a temperature of −40° to −80° F. The effect of the temperature differential is to induce the growth of relatively large crystalline structures during the initial stages of freeze drying, followed by a rapid chilling of the layer of frozen material at the reduced temperature of the liquid circulated to the unit 18.

In general, the processing of the frozen material as a thin layer provides certain advantages. Specifically, the thickness of the layer is easily controlled to provide a uniform dimension prior to breaking and classifying as hereinafter described. By way of illustration, aqueous coffee extract can be frozen to a layer thickness of the order of one-eighth inch, thereby facilitating subsequent fracturing and breaking of the frozen material to achieve more uniform particle sizes during the subsequent comminuting or grinding operation. Uniform sizes of the fractured pieces also reduces the tendency towards production of fines and pieces of substandard size (i.e., less than about 16-mesh).

It will be understood, of course, that the freezing conditions will depend to some extent on the character of the aqueous solids-containing liquid being introduced into the system. Thus, in the case of an aqueous coffee extract, the liquid will normally have a solids concentration of from about 20 to 40 percent. The temperature of the liquid will normally correspond to that of the atmosphere (i.e., about 30° to 90° F.). At this solids concentration, the freeze dried product will have the desired bulk density. However, where the concentration of the liquid extract is above about 40 percent, it is desirable that steps be taken prior to the contact freezing to control the bulk density of the final product. Such control of the final bulk density may be suitably performed in a concentrate expansion process, for example, as disclosed in copending application Ser. No. 596,598 filed Aug. 21, 1966, in the names of Hachiro J. Togashi and James L. Mercer. The coffee extract, expanded as described in this application, may be fed directly to the contact freezer if color of the final product is not of great concern. Alternatively, the color may be deepened by "over expanding" a portion of the extract liquid, followed by mixing of the same with an unexpanded extract in a suitable blender. Of course, similar procedures may be employed with other solids-containing liquids, such as fruit juice and other food liquids, blood plasma, sera and like biological substances.

Alternatively, it may be economically desirable to increase the solids concentration of the liquid feed prior to the contact freezing, while controlling the ultimate product bulk density. This may be accomplished by procedures as disclosed in copending application Ser. No. 881,882, filed Dec. 3, 1969 by Hachiro J. Togashi, wherein a previously dried particulate solid (containing air or voids therein) is dissolved in the starting aqueous liquid, thereby increasing the solids concentration. By adjusting the mixing conditions to retain a predetermined amount of air in the feed liquid, the bulk density of the final product can be controlled. Again, the described technique may be used with feed liquids such as aqueous coffee extract and various other food liquids, biological substances and the like.

In general, the brine refrigerant introduced for purposes of heat exchange through line 102 should be at a very low temperature, of the order of −90° F. or lower. At this temperature, the brine may also be circulated to a refrigerated hopper 118 associated with the breaker 22, to insure that the broken fragments will be maintained as separate or discrete pieces of frozen material upon introduction to the feed conveyance and classifying system.

FREEZE DRYING

Considered broadly, the freeze drying operation of the present invention involves two general stages, a classifying or sizing stage to generally determine the particle size of the freeze dried product and a dehydrating stage wherein the ice present in the frozen feed material is sublimated in the vapor state, frozen, and removed from the system. Both of these stages depend upon the used of a circulating refrigerant to maintain intermediate and final product characteristics.

As noted above, the refrigerant brine for the freezing operation is at a low temperature (e.g., −90° F.) sufficient to reduce the temperature of the frozen material passing over the freezing unit 18 to a temperature of the order of −75° F., thus insuring that the frozen material is brittle enough to be broken into small pieces (about 2 inches square) as it leaves the belt 12. Similar considerations also exist as the broken material is subjected to classification or sizing operations to insure that the particle sizes fed to the freeze drying chamber 42 will be those desired for optimum dehydration and end product characteristics. On the other hand, within the freeze drying chamber itself, separately employed refrigerated components should not compete with the condenser units, which must continue to function as high-speed pumps in causing water vapor and other condensable gases to condense and freeze on their surfaces. Accordingly, as illustrated in FIG. 1, two separate refrigeration systems are employed, each having a heat exchange unit which is separately supplied by a low temperature refrigerant brine (freon). Thus, heat exchanger 120 can be supplied with a low temperature refrigerant (e.g., freon brine) at a temperature of −90° F. or lower, of a capacity to supply the various auxiliary heat exchange units, such as the refrigerated jacketing for the conveyors 26 and 40, the comminutor and classifier 30, 32, and the condenser plates 62. In like fashion, heat exchanger 122 can be supplied with a refrigerant brine (e.g. freon) at a somewhat higher temperature ranging from about −10° to −35° F., of a capacity to supply circulating refrigerant for the refrigerated feed hoppers 46 and 50 leading to the freeze drying chamber, as well as to each of the vibrating conveyor decks 54, 56, 58 and 60.

FEED CONVEYANCE AND CLASSIFICATION

As noted above, the broken fragments of frozen material from the freezing operation are subject to classification to insure that the particle sizes fed to the freeze drying chamber are optimum for the freeze drying operation. As illustrated in FIG. 1, the classification operation is further dependent upon the refrigerated conveyors 28 and 40 which operate progressively to supply the fragmented frozen material to the comminutor 30 and classifier 32, and to convey the classified particles of feed material from the feed hopper 34 to the freeze drying chamber.

As illustrated, the conveyor 28 is in the form of an elongated tube through which the broken fragments from the breaker 22 may be physically lifted to an overhead position with respect to the comminutor 30. Alternatively, a gravity system may be employed to effect conveyance. In either event, the conveyor 28 is suitably jacketed, as at 124, to allow circulation of a low temperature refrigeration liquid flowing through the lines 126, 128 and 130 from the heat exchange unit 120 and returning to the same through the lines 132, 134, tank 136 and 138, under the influence of the pump 140. Within the comminutor 30, which may be a conventional fitz mill, fragments are reduced in size and pass through a surrounding screen so that the particle size of the frozen material fed to the classifier 32 is generally below about four mesh, U.S. standard screen size. The classifier 32 acts to discharge oversized material, represented at 38, for recycle through the comminutor. By way of illustration, approximately 50 percent of the material initially passing to the classifier 32 may be recycled for further processing and reduction in size to thereby insure a uniform particle size of the material discharged from the classifier. The uniformly sized frozen particles pass at 36 to the refrigerated hopper 34 from whence they pass to the discharge conveyor 40. The conveyor 40 is of the same type as the conveyor 26 and may be similarly jacketed, as at 142, to insure that the product remains frozen and in the desired particulate form. It will be noted that throughout the operations just described the unit operations are carried out in conjunction with circulation of refrigerant liquid from the lines 128 and 130 to maintain desired temperature conditions.

FREEZE DRYING CHAMBER

Classified particles of frozen material are fed at 50 to the freeze drying chamber through the vapor lock 44, the feed hopper 46 and the vapor lock 48. In this operation, frozen particles are passed to the feed hopper 46, which is continuously in communication with the vacuum pump 152 adapted to maintain a desired vacuum (e.g., about 400 to 800 microns) within the feed hopper until the particles are ready to be introduced to the freeze drying chamber 42. At proper intervals, the material is fed from the feed hopper 46 through the vapor lock 48 to the internal feed hopper 50 and vibrating feeder 52. While the inlet vapor lock 44 is maintained at a relatively low temperature (−90° F.) by a circulating refrigerant liquid from the line 128, the feed hopper 46 and vapor lock 48 are maintained at a somewhat higher temperature (−35° F.) by means of a refrigerant liquid circulated through the line 154 from the heat exchange unit 122. Return of the refrigerating liquid from these units is through the return lines 156, 158, tank 160 and the pump 162.

It will be noted that the heat exchange unit 122 also supplies circulating refrigerant liquid to the vibrating conveyor decks 54, 56, 58 and 60 within the freeze drying chamber, through branch lines from the line 154 (FIG. 1), the return again being through line 56 and line 164.

Figure 2A:
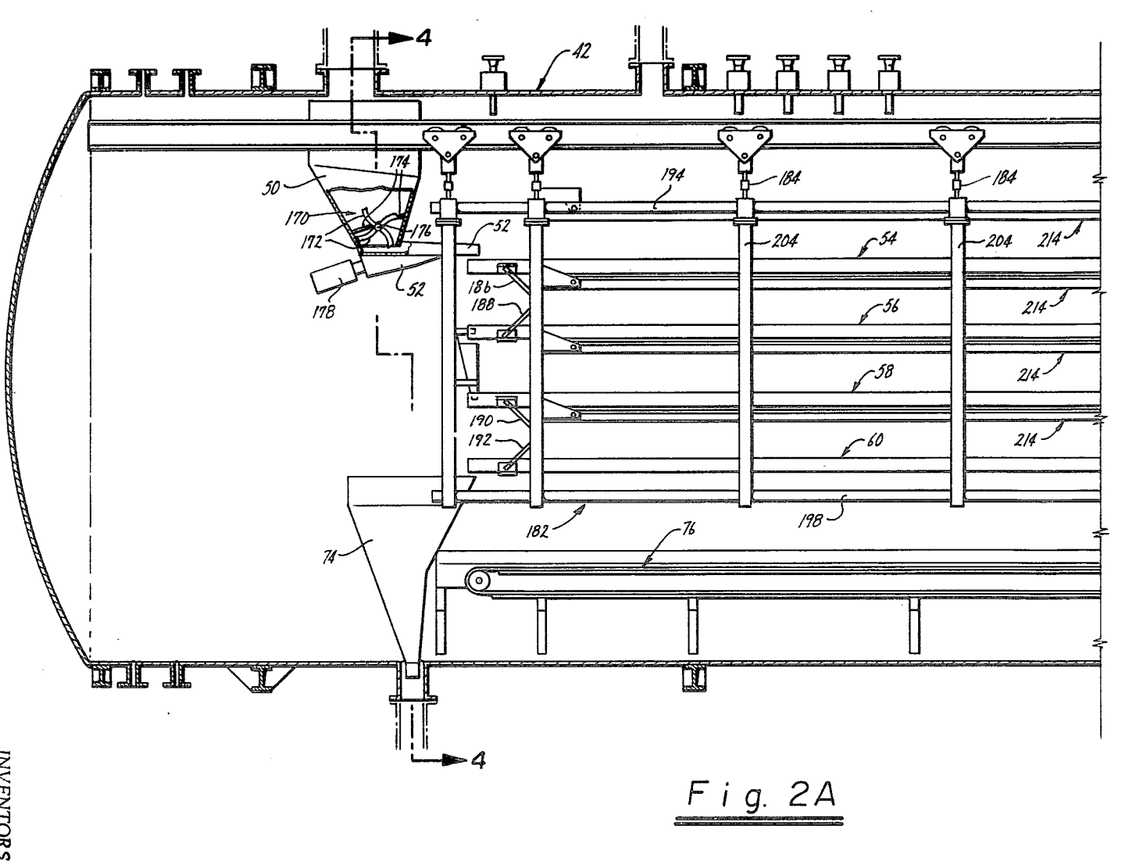
FIGS. 2A and B are a view in vertical elevation of a freeze drying chamber useful in conjunction with the method and the system of apparatus of the present invention.
Figure 4:
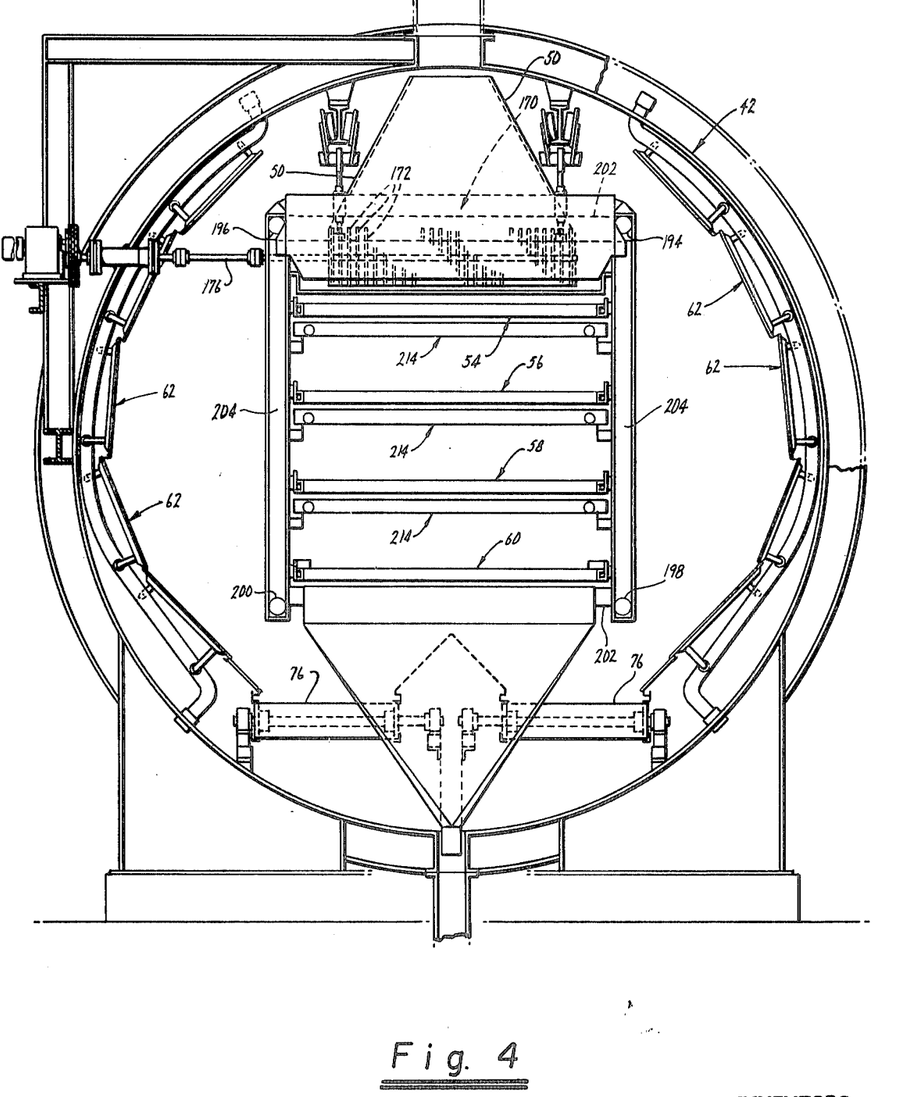
FIG. 4 is a like view along the line 4—4 of FIG. 2A.

Referring to FIGS. 2A and 4, the feed hopper 50 within the freeze drying chamber is suitably provided with means 170 to break apart and individualize any clusters of particles which may have adhered to one another within the feed hopper 46. As illustrated, such means comprises a series of radially extending arms 172 mounted to rotate between the bars 174 of an adjacent grating on a transverse shaft 176. The effect is to lightly impact and to break up the clusters of particles so that the particles freely fall in individualized form onto the vibrating feeder 52. The feeder 52, which may be separately provided with a motor driven eccentric vibrator 178, receives the particles from the feed hopper 50 and discharges them to the inlet end of the upper vibratory conveyor deck 54.

VIBRATING CONVEYOR

It is a feature of the present invention that the freeze drying is accomplished while the individualized particles are controllably moved across a series of vertically spaced vibrating conveying decks within the freeze drying chamber. It is a further desired feature of the invention that the vibrating conveyor not interfere with the controlled conditions of equilibrium within the freeze drying chamber, by transmitting heat or vibratory forces to the same, and that the conveying decks themselves are not materially affected by changes in temperature within the freeze drying chamber.

Figure 2B:
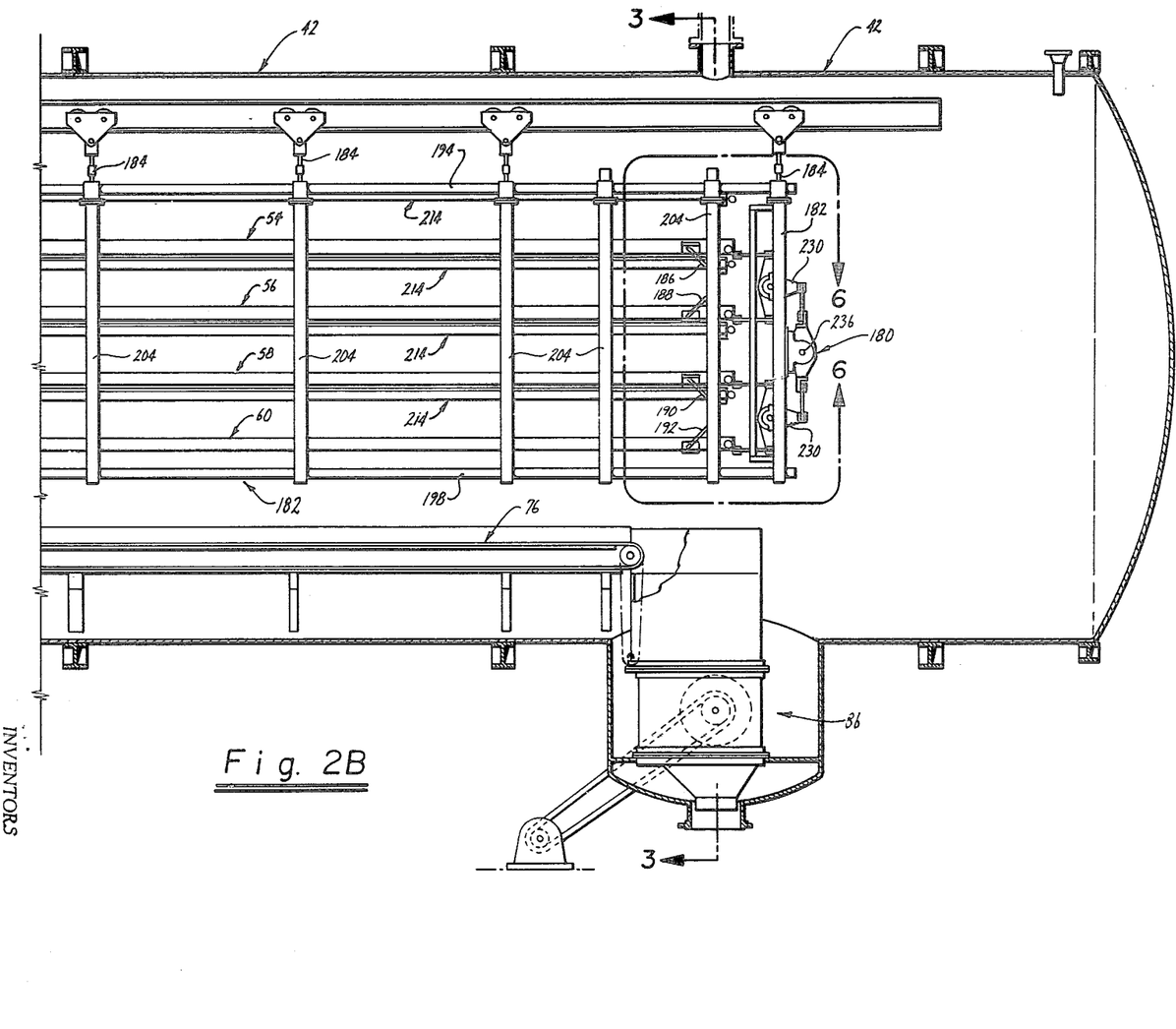
Figure 3:
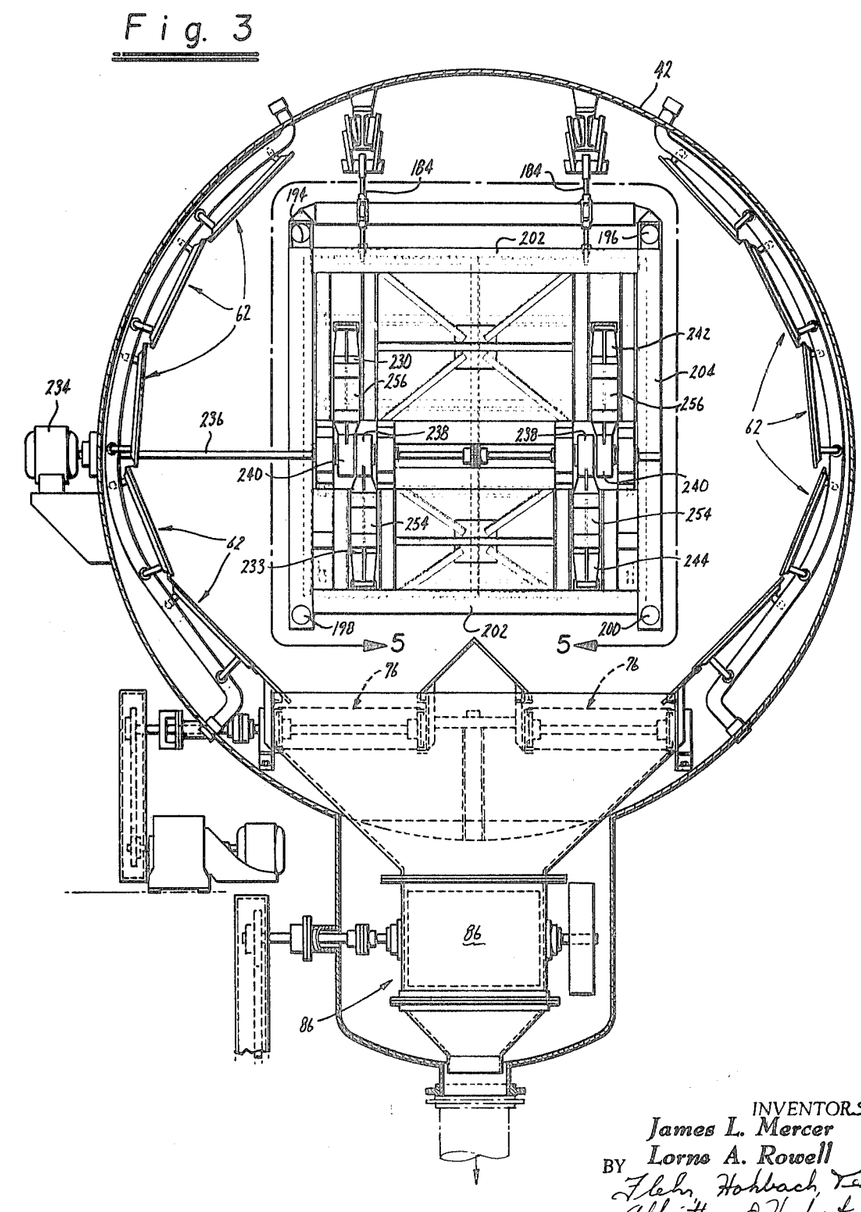
FIG. 3 is a view in transverse section along the line of 3—3 of FIG. 2B.

As particularly illustrated in FIGS. 2 through 4, the vibrating conveyor means (generally represented at 180) comprise pairs of vertically spaced conveying decks 54, (e.g., and 58, 60, mounted in superimposed relationship within a supporting, fluid conducting tubular framework 182 which, in turn, is suspended from the top of the freeze drying chamber 42. The suspension mounting, including freely supported pivot members 184, serves to isolate the vibratory conveyor and its vibrating mechanism from the freeze drying chamber, thereby minimizing transfer of vibratory forces to the chamber. The separate conveying decks are likewise resiliently mounted within the tubular frame 182 by means of flat springs 186, 188, 190 and 192, at spaced intervals along the full length of the conveying decks, as hereinafter described.

Figure 5:
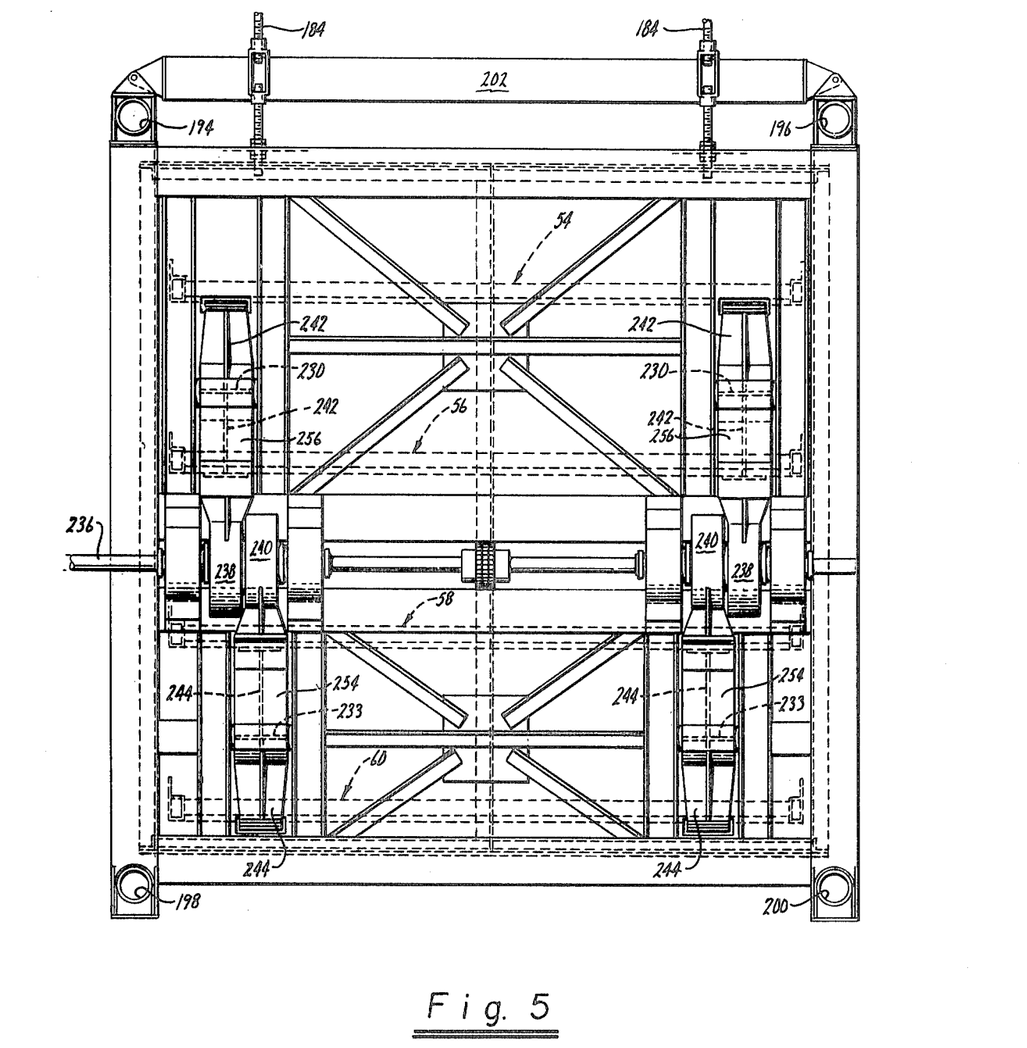
FIG. 5 is an enlarged view of a portion of the apparatus of FIG. 3, taken along the line 5—5 thereof.

As best illustrated in FIGS. 3 to 5, the tubular frame 182 comprises upper longitudinally extending members 194 and 196 and lower longitudinally extending members 198 and 200, which are of hollow tubular construction to facilitate the circulation therethrough of the cooling liquid. The frame also comprises transverse bracing members 202 and vertical bracing members 204, which, if desired, may also be of hollow tubular construction to interconnect with the members 194, 196, 198 and 200 laterally and vertically. As noted previously, the tubular frame is supplied with cooling liquid to equalize the same with temperature change, such supply being schematically shown in FIG. 1 by the single line 206.

Figure 9:
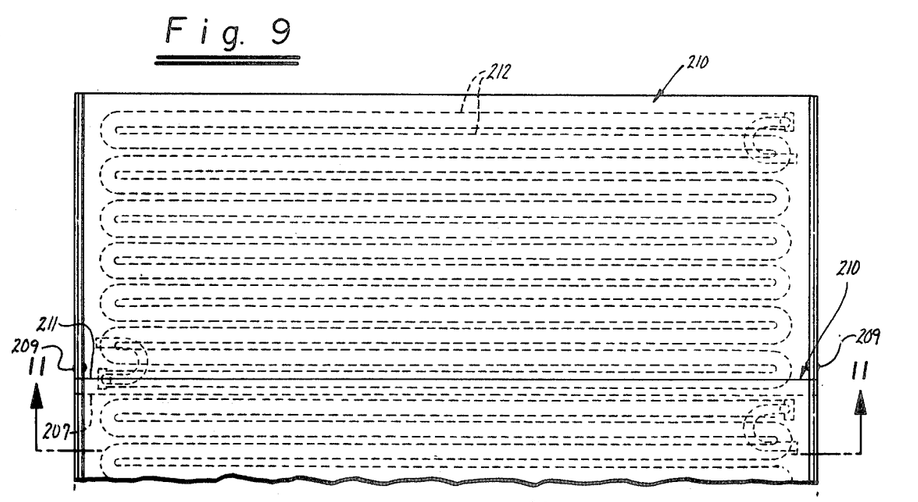
FIG. 9 is a like view in top plan taken along the line 9—9 of FIG. 6.
Figure 10:
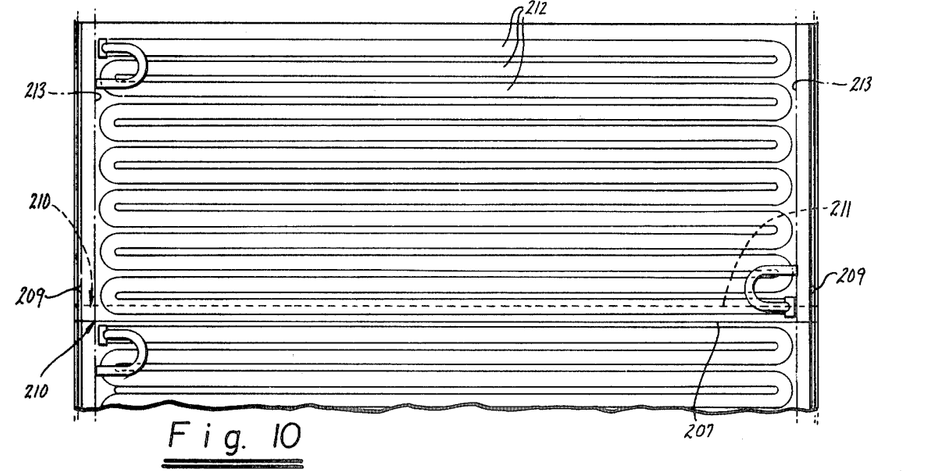
FIG. 10 is a like view in bottom plan taken along the line 10—10 of FIG. 6.
Figure 11:
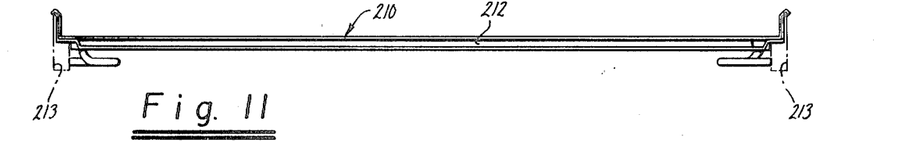
FIG. 11 is a sectional view taken along the line 11—11 of FIG. 9.
Figure 12:
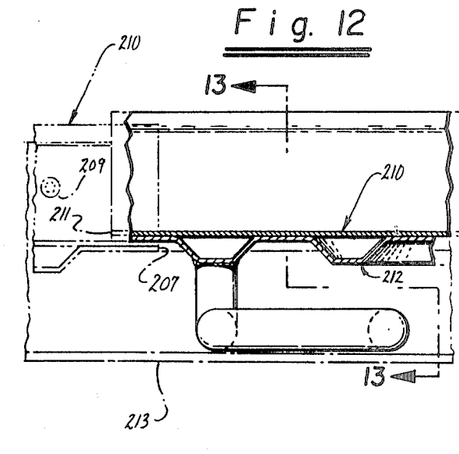
FIG. 12 is a further enlarged detail view along the line 12—12 of FIG. 6.
Figure 13:
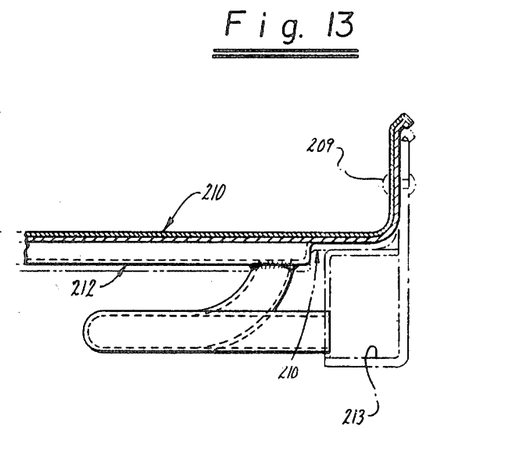
FIG. 13 is a like view along the line 13—13 of FIG. 12.
Figure 14:
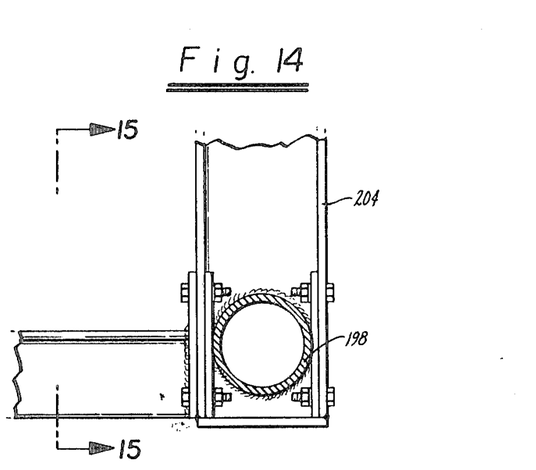
FIG. 14 is a like view along the line 14—14 of FIG. 6.
Figure 15:
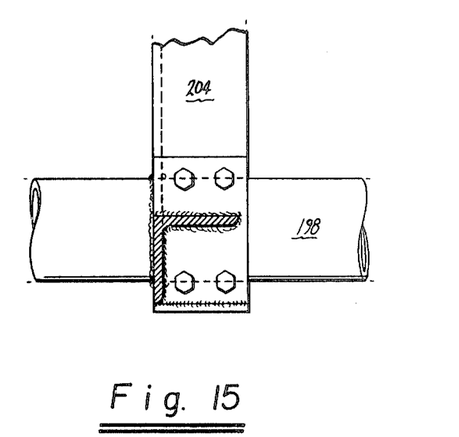
FIG. 15 is a like view along the line 15—15 of FIG. 14.

The separate conveying decks, 54, 56, 58 and 60 are similar in construction and, since a balanced system is desired, are generally of equal size and weight and of substantially the same length. As best illustrated in FIGS. 9 and 10, the upper surface of each deck is formed of a series of overlapping plate sections 210 which are connected to the side frames of the decks adjacent one lateral edge 207, as at 209, so as to permit a sliding length adjustment adjacent the other lateral edge 211, which rests in free sliding relation above the connected edge portion of the adjacent plate section 210. As illustrated, each individual plate section is provided with a cooling coil 212 beneath the upper place surface, which is supplied with cooling fluid from the line 154 by means of flexible conduit (not shown) interconnecting the integral fluid supply conduits 213 of each of the decks (see FIG. 13). The decks with their overlapping plate surfaces are individually vibrated in the manner hereinafter described so that the frozen particles move along the series of plates 210 which form the conveying surface. Because of the overlap between the plates 210, the output ends will be slightly higher than the input ends so that the material being conveyed will be turned over as it passes from one plate surface to the next, thereby insuring a more uniform freeze drying of the material.

Figure 6:
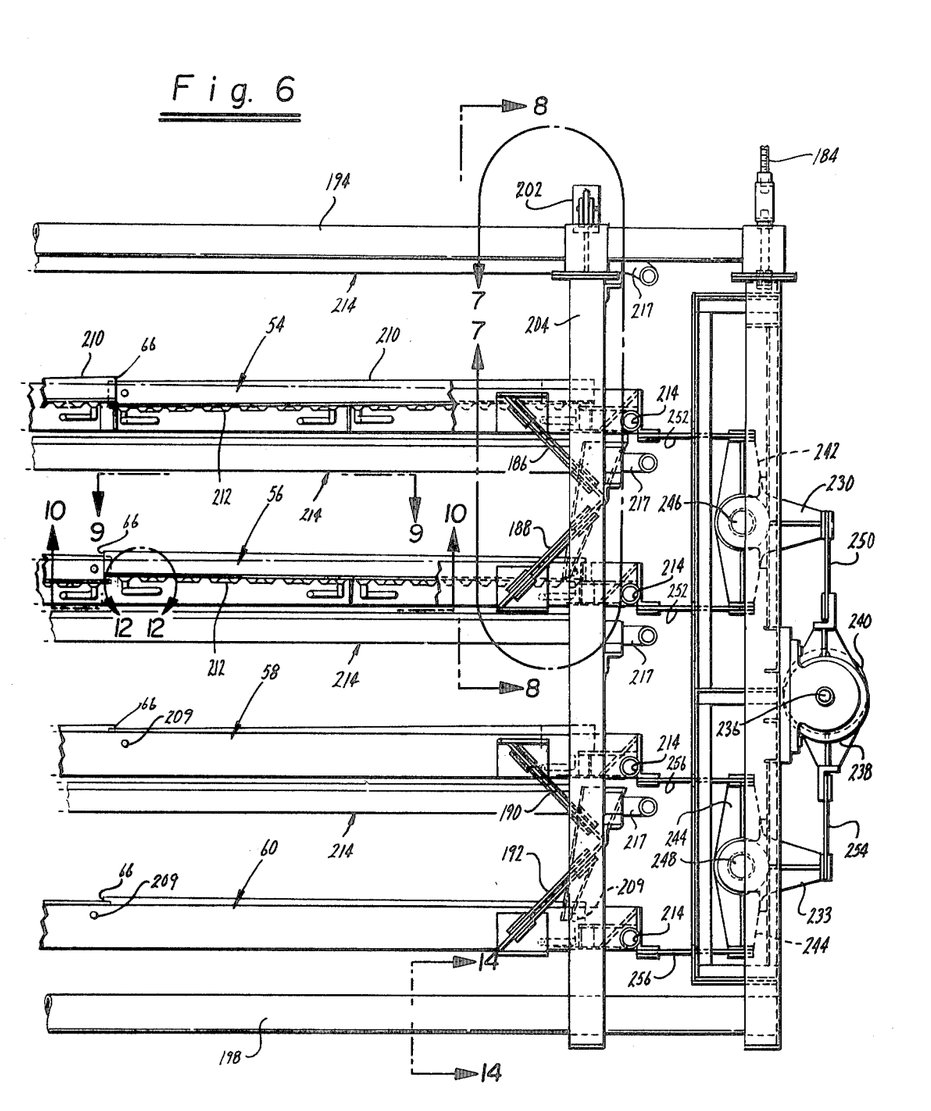
FIG. 6 is an enlarged view of a portion of the apparatus of FIG. 2B, taken along the line 6—6 of FIG. 5.
Figure 16:
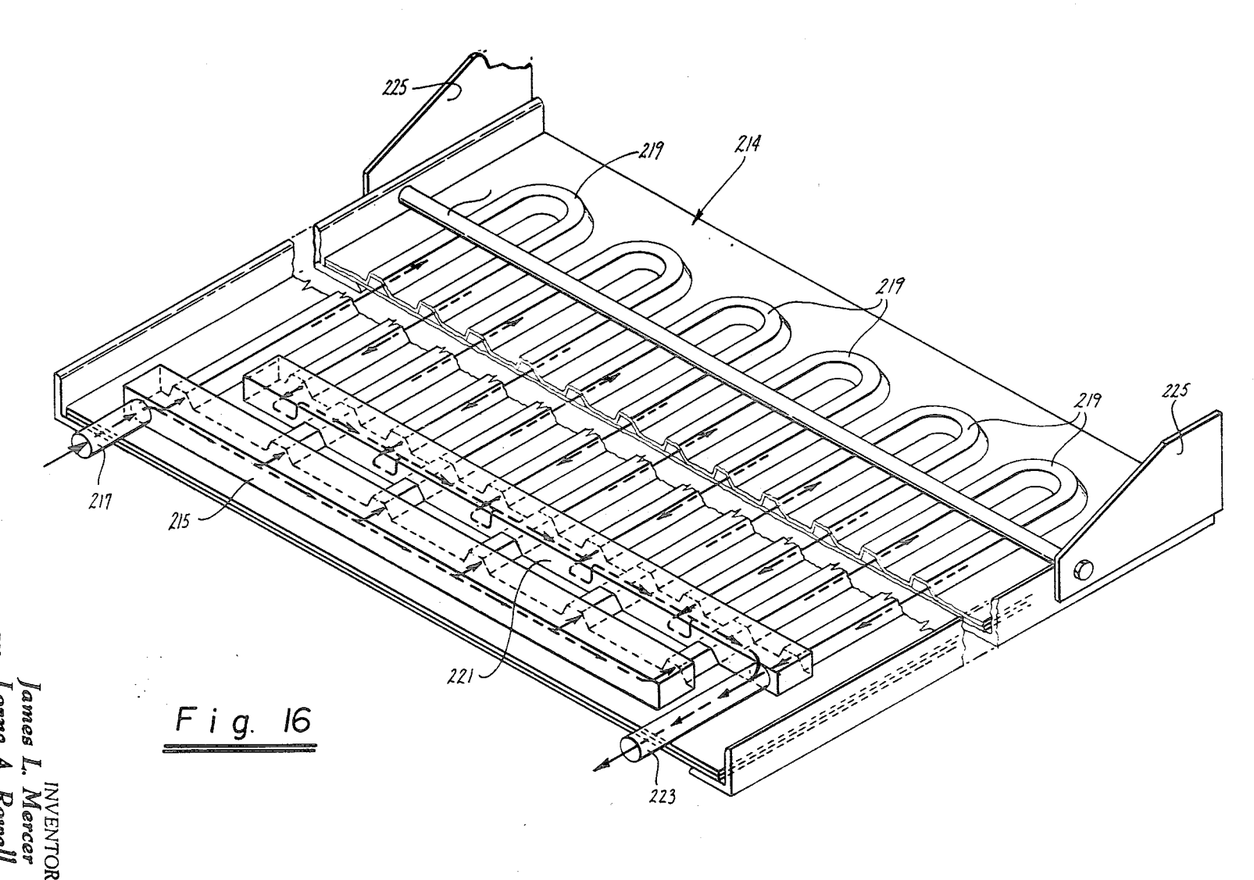
FIG. 16 is a view in perspective of one form of radiant heating means useful in carrying out the invention.

During the freeze drying operation, each of the conveying decks is exposed to a source of radiant energy 214, appropriately mounted above the conveyor surface to transmit energy downwardly to frozen particles moving on the conveyor deck below. In the illustrated apparatus (FIGS. 6-8, and 16) the radiant energy sources are the fluid conducting type, and are mounted in self-supporting fashion within the tubular framework 182. Thus, as particularly illustrated in FIG. 16, the radiant heating units 214 include transverse inlet headers 215 adapted to be supplied with heated fluid through the inlet conduit 217, which is connected by means of the integral fluid conducting pathways 219 to the outlet header 221 and fluid outlet 223. The individual heating units can be mounted at a desired angle on the tubular framework by means of the mounting brackets 225 and transverse supports 227. As shown in FIG. 6, radiant heating units mounted in the frame near the top of the chamber 42 supply energy to the upper conveyor unit 54. In like fashion, the conveying deck 56 is provided with radiant energy from a radiant heating units 214 mounted in the frame immediately below the upper conveying deck 54. The conveying decks 58 and 60 are similarly provided with radiant heat by the radiant heating units 215 mounted within the frame immediately below the conveyor deck above.

Figures 7, 8:
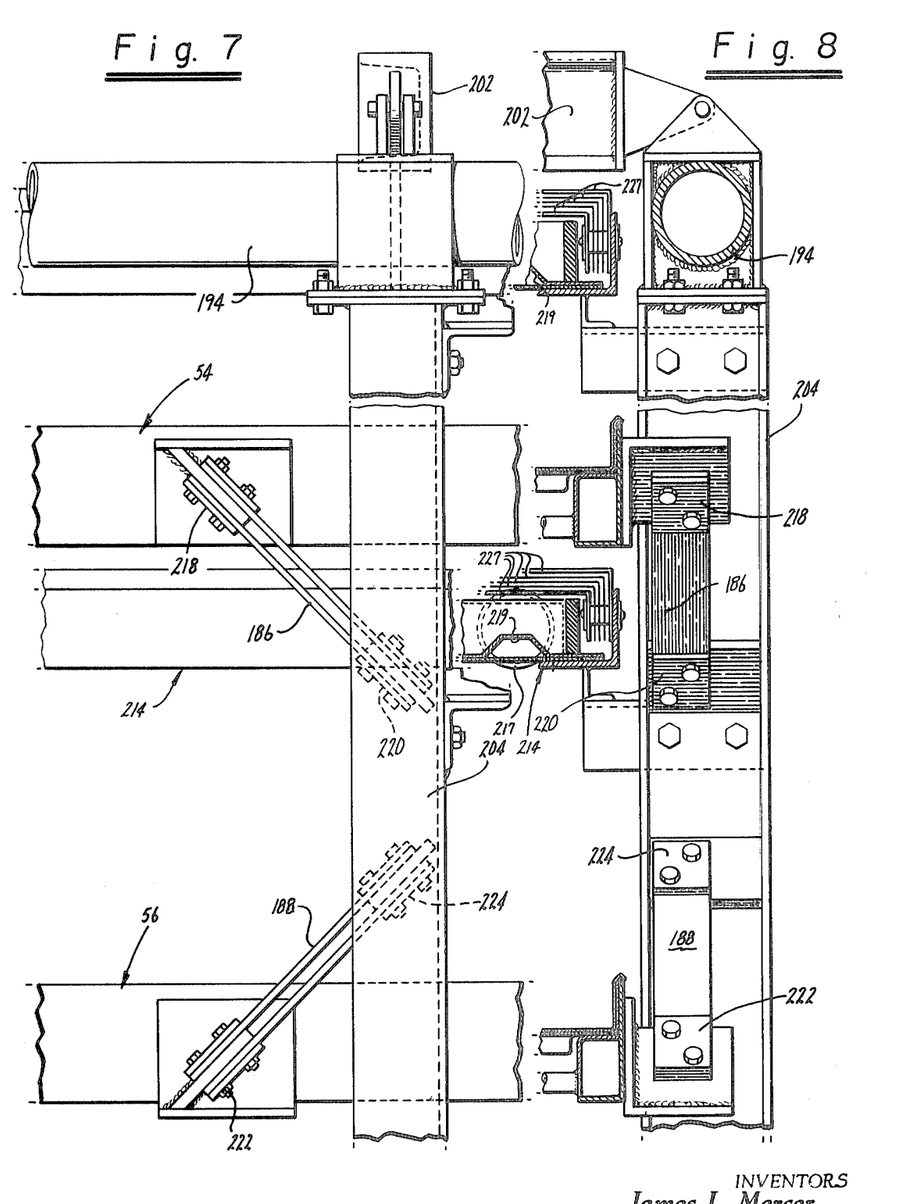
FIG. 7 is a further enlarged detail view taken along the line 7—7 of FIG. 6.
FIG. 8 is a like view taken along the line 8—8 of FIG. 6.

Preferably, at least 80 percent of the radiant energy supplied by the units 214 has a wave length in excess of 2.5 microns (supplied theoretically by a black body heated to a temperature not higher than 90° F.). In practice, the radiant energy units 214 are heated by fluid circulated through the integral conduits 219 which are heated to a temperature within the range from about 300° to 700° F. Thus, the temperature of the fluid in the uppermost radiant heating units 214 may be of the order of 600° F. whereas the temperature of the fluid circulated through the intermediate units may be progressively lower and in the lowermost units 214 may be of the order of 400° F. Alternatively, the radiant energy sources 214 may be heated metal plates which are heated electrically to the desired operating temperature, or, alternatively, may be plates which are heated from behind by means of quartz enclosed hot filaments (e.g., tungsten) lamps or any other suitable manner to obtain the desired operating temperatures. Regardless of the form of the radiant heating units 214, it is generally desirable to provide some sort of shielding above such units to prevent undesired heating of the conveying decks from below. As illustrated in FIG. 8, the shielding may be in the form of a multiple of deflecting shields 227 supported in such fashion as to extend between the radiant heating sources 214 and the cooling coils 212 of the adjacent conveying decks.

As previously noted, the separate conveying decks are resiliently mounted for vibration within the frame 182 by means of pairs of flat springs clamped at one end to the decks and at the other end to the vertical bracing members 204 of the frame. Thus, as is particularly illustrated in FIGS. 6 through 8, the top conveying deck 54 is supported in an upwardly spaced relationship by pairs of flat springs 186, secured to the deck by clamp means 218 and to the uprights 204 by clamp means 220 (FIG. 7). The conveying deck 56 next below is similarly supported in downward depending fashion by pairs of flat springs 188, secured to the deck by the clamp means 222 and to the uprights by the clamp means 224. In general, the angles of inclination and declination of the pairs springs 186 and 188 are substantially identical, and are chosen to achieve optimum characteristics of movement of the frozen particles along the conveyor decks. As best illustrated in FIGS. 2 and 6, the lower decks 58 and 60 are mounted for vibration within the frame 182 in substantially identical fashion to the upper pair of decks, by the pairs flat springs 190 and 192.

Referring to FIG. 6, it will be noted that the upper conveying decks 54 and 56 are mounted for vibration as a pair in conjunction with a rocker arm 230 whereas the lower conveying decks 58 and 60 are likewise mounted as a pair for vibration by the rocker arm 233. The drive means for vibrating the pairs of decks 54, 56 and 58, 60 comprises a motor 234 which is preferably mounted exteriorly of the freeze drying chamber. The motor operates through a flexible shaft 236 to drive pairs of eccentrics 238 and 240 associated with the rocker arms 230 and 233, respectively. As will be apparent from FIGS. 5 and 6, the two eccentrics 238 and the two eccentrics 240 are 180° out of phase with one another so as to be diametrically opposed. That is, as the two eccentrics 238 move to rotate the extending arms 242 of the rocker arm 230 in a clockwise direction (as viewed in FIG. 6), the two eccentrics 240 move to rotate the arms 244 of the rocker arm 233 in a counterclockwise direction. As the rotation of the eccentrics continues, the direction of rocker arms 242 and 244 will reverse. It will be seen that the horizontal direction of movement of the upper and lower decks 54 and 60 will always be the same, and the horizontal movement of the intermediate decks 56 and 58 will also be the same, but in a direction opposite to that of decks 54 and 60, thus balancing the horizontal forces within the framework. In contrast, when upper deck 54 moves up, the lower deck 60 moves down and, in like fashion, the upper middle deck 56 will move up when the lower middle deck 58 moves down, thus balancing the vertical forces within the framework. The described operation thus provides a balanced vibratory motion between the pairs of decks, which holds true for any position of the vibrating cycle.

In the mounting of the eccentric drive members, it will be understood that the rocker members 230 and 233 are mounted for free rotation, respectively, on transverse shafts 246 and 248 carried by the frame. The eccentrics 238 are connected to the rocker arms 230 by flat springs 250 and the rocker arms 242 are similarly connected to the conveying decks 54 and 56 by flat springs 252, such construction providing desired resiliency. In like fashion, the eccentrics 240 are connected to the rocker arms 233 by flat springs 254 and the rocker arms 244 are connected to the conveying decks 58 and 60 by the flat springs 256. Power requirements are greatly reduced in the described balanced system because the stored energy at the end of each stroke is returned to the decks in opposing directions, less a small loss due to friction. Consequently, once the system has reached its natural operating frequency, the only additional energy to be supplied by the drive through the eccentrics is the small amount required to replenish the friction losses.

It will be apparent from the foregoing that the fundamental (static and dynamic) forces of vibration generated by the four conveying decks tend to cancel one another out within the frame 182 so that transference of vibratory forces from the frame to the freeze drying chamber 42 is minimized.

In general, the amplitude of vibration as well as the "pitch" and "throw" of the conveyor decks 54–60 is dependent upon the construction and arrangement of the eccentrics 238 and 240, the rocker arms 230 and 233, and the flat springs 186, 188 and 190, 192. In like fashion, the frequency of the vibration is dependent upon the rotary speed of the motor 234 and the rotary speed (i.e., r.p.m.) of the drive shaft 236. To insure that the forces handled by the drive components are kept at a minimum, resulting in smaller and lighter drive members, it is desirable to drive the spring mounted system at its natural frequency. This is accomplished in the described system of apparatus by the use of drive connections (e.g., components 250 to 256) and conveyor deck supports (e.g., components 186 to 192) which are in the form of flat springs selected to have the necessary rigidity to produce a natural frequency of vibration of the system approximating the "frequency" of the eccentric drive as hereinbefore defined. As a practical matter, of course, appropriate spring members may be selected and the drive cycled to achieve a condition which matches the natural frequency vibration of the spring mounted system.

From an operating standpoint, it has been found that effective freeze drying is accomplished on vibratory conveyor decks of the type described when the rate of material movement is relatively slow, but the amount of bouncing or "dancing" on the screen remains relatively rapid. For example, in the vibratory system illustrated this frequency might be of the order of 240 cycles per minute. It has been additionally found that a desired rapid rate of conveyance together with a very rapid bouncing or "dancing" of the particles can be obtained at the natural vibration frequency of the spring support system which, in the illustrated system, might be about 360 cycles per minute. In other words, at 240 cycles per minute, the particles can be held at any desired position on the vibratory pathway with virtually no forward movement whereas at the higher cycling rate of 360 cycles per minute, a forward progress of the order of 10 feet per minute is achieved. By alternating between the lower and the higher vibration frequency, say between 240 and 360 cycles per minute, virtually any rate of movement up to 10 feet per minute can be obtained, to achieve freeze drying cycles of 20 minutes or longer, as may be desired. Accordingly, in conjunction with an initial freezing cycle of 8 to 15 minutes, together with 1 to 3 minutes for conveyance and classification, a total period for freezing and freeze drying a liquid product in the described equipment is about 30 to 40 minutes, at the low side, up to longer periods, as may be feasible. For practical reasons, a freeze drying cycle in excess of about 150 minutes is generally too long to achieve an economical and efficient use of the equipment.

It will be appreciated that the operating characteristics most satisfactory to a particular vibratory conveyor unit will to some extent be a matter of equipment design. Thus a unit design providing a somewhat smaller throw might require a higher vibration frequency, say 400 to 450 cycles per minute, to achieve the same conveying rate. In like fashion a unit providing a somewhat greater throw might achieve a desired conveying rate at a lower frequency, say 150 to 200 cycles per minute. In general, such variations are considered to be clearly within the scope of the invention as herein described.

In a general operation of the vibratory conveyor means described, frozen particles are advanced first along the upper conveyor deck 54 where they are subjected to cooling from below and to radiant heating by a source of radiant energy (not shown) located above the upper deck. Partially freeze dried particles discharged over the end of the conveyor deck 54, at 68, pass in sequence to the vibratory conveying decks 56, 58 and 60 below. In each pass on these decks, they are cooled from below by the internal cooling means 212 while simultaneously being heated from above by the source of radiant energy 214 carried by the conveying deck next above. Freeze dried particles ultimately pass to the hopper 74 for discharge from the system, in the manner previously described.

VACUUM - CONDENSER SYSTEM

As the frozen particles pass in sequence from one vibrating conveyor deck to the next, the ice contained therein is sublimed to water vapor and condenses as a thin layer of ice on the surfaces of the condensing plates 62. In a preferred system of apparatus, these condensing plates are cryoplates of the type described in Togashi and Mercer U.S. Pat. No. 3,293,766, the processing of the present invention being an improvement on the freeze drying process therein disclosed.

In the system of apparatus herein described, the cryoplate condensing means 62 are mounted in banks on either side of the vibratory conveyor path created by the separate vibrating decks 54–60. The separate cryoplate condensers 62 are each connected to the source of a refrigerant liquid passing through the heat exchange unit 120 through the line 126 and the separate connecting lines 260, with the spent refrigerant being returned through the lines 262 and 264 and lines 266 and 134.

In general, the cryoplate condenser means operate effectively within an evacuated freeze drying chamber maintained at a vacuum of the order of about 400 to 800 microns. Such vacuum is maintained in the present system of apparatus by the vacuum pump 152 which communicates in conventional fashion with the interior of the freeze drying chamber 42 through the lines 153.

ICE REMOVAL SYSTEM

In the illustrated apparatus, means are provided for periodically removing the ice which condenses and collects on the surfaces of the cryoplate condensing means 62. Conveniently the ice can be removed by periodically circulating heated refrigerant liquid through the condenser means, preferably in a progressive cycle wherein one of condensers is being deiced while the others are in operation.

As illustrated in FIG. 1, the spent circulating refrigerant from each cryoplate condenser can be diverted through one of the connecting lines 263 to the line 264 leading through line 266 to a deice tank 268. The latter operates in conjunction with the pump 270 and a deicing heater 272 to provide a supply of relatively warm circulating refrigerant which can be selectively introduced through the line 274 and a connecting line 276, to a particular cyroplate condenser means. The circulating hot material causes the ice to be immediately dislodged from the cryoplate surface, and to fall to the bottom of the freeze drying chamber where it collects on the conveyor 76. As disclosed in U.S. Pat. No. 3,276,139, baffle or screening means can be employed to prevent ice from contaminating the product being dehydrated.

At intervals, the ice discharge conveyor 76 can be operated to convey ice to the breaker means 86, following which the broken ice can be passed through a double valve vapor lock 88 to the melt tank 90. There the ice can be melted by a supply of hot water (e.g., 180° F.) introduced to the line 92. Thereafter, the melted ice can be discharged through the double valve vapor lock 94 to waste.

Features and advantages of the herein described process for freezing and thereafter freeze drying various solids-containing liquids are demonstrated by the following exemplary disclosure related to the freezing and freeze drying of aqueous coffee extract, carried out on apparatus as illustrated in the drawings.

EXAMPLE

A 40 percent coffee concentrate was fed in a controlled manner to the stainless steel belt 12, and frozen in about 10 minutes. Desired freezing conditions were obtained by circulating trichlorethylene as a liquid brine to the freezing units 14, 16 and 18, where it was projected as a series of liquid sprays against the underside of the belt to cause the coffee concentrate to freeze as a relatively thin layer of frozen coffee extract (about one-eighth inch thick). Freezing was carried out in progressive stages to induce the growth of relatively large crystalline structures: the trichlorethylene brine being circulated to the freezing unit 14 at a temperature of +5°., to the freezing units 16 at a temperature of 0° F., and to the freezing unit 18 at a temperature of −60° F. The frozen material in the form of a thin sheet of frozen concentrate in brittle state was discharged from the belt 12 to the breaker unit 22, where pieces fracturing and falling off the belt were reduced in size to units approximately 2 inches by 2 inches in transverse dimension and one eighth inch in thickness. The broken material was fed to the refrigerated tubular conveyor 26 (−90° F.) and transferred to the Fitz mill granulator 30 where the frozen material was comminuted to an approximate size distribution such that about 40 percent of the material passed through a No. 4 U.S. Standard mesh screen. The oversized material was recycled back to the conveyor 26 for regrinding in the Fitz mill granulator. The reground material plus the original material passing through the screen was fed to the intermediate jacketed hopper 34 (−90° F.). The refrigerated granulated material in the hopper 34 was discharged on demand to the refrigerated tubular conveyor 40 (−90° F.) for transfer to the freeze drying chamber through the jacketed vapor locks 44 (−90° F.) and 48 (−20° F.), the transfer of fresh material being effected at intervals of about 15 minutes. The frozen granular material was received internally of the freeze drying chamber 42 within the jacketed internal feed hopper 50 (−20° F.).

Within the freeze drying chamber, the product was fed on demand by the vibratory conveyor 50 (−20° F.) to the upper conveying deck 54, from whence the material was passed in succession to the vibratory conveyor decks 56, 58 and 60. The vibratory conveyor system generally consisted of the four balanced conveyors herein described, each 5 feet wide and 50 feet long. The trays or plates 210 of the conveyors were held at a temperature of −20° F. by circulation of refrigerant brine beneath the conveying decks. The product was moved by the conveyors in a bouncing, vibratory manner beneath six different radiant heating units 214, each equal in width to the tray below, and each operating at a different temperature. The temperature of the radiant heating units decreased progressively in 40° stages from a high of 600° F. at the first unit to a low of 400° F. at the unit closest to the point of product discharge, at 74. During the progress of the granular frozen particles through the vibratory conveyor, the frequency of vibration of the conveyors was alternated by cycling the vibratory drive motor between two speeds, adapted to achieve 10 seconds at 360 cycles per minute to induce agitation and forward movement of the particles and 20 seconds at 240 cycles to substantially arrest forward movement of the particles. The amplitude of vibration was of the order of three-sixteenth inch. The agitation time of the granular particles undergoing freeze drying from the time of initial contact with the conveyor until the product was discharged from the last conveyor, was approximately 55 minutes. At the point of discharge, the granular material was at a temperature of the order of 70° F. and was dry (e.g., moisture content less than about 5 percent).

Ice removal was accomplished during the freeze drying operation through use of a battery of cryoplate condensers 62 (−90° F.) in 12 different circuits (six on either side of the balanced conveyor system). The arrangement permitted deicing of any one condenser by heating, independently of the others. Ice build-up on the condensers was generally less than 1 inch, and was controlled by deicing one of the twelve banks of the condensers every 30 minutes by raising the temperature of the fluid circulated to the condenser plates to about 150° F. The ice falling to the bottom of the freeze drying chamber was collected on the conveyor 76, and conveyed at intervals to the ice crusher 86 where the ice was reduced to a granular size less than about three-fourths inch in diameter. The broken ice was discharged through vapor lock 88 to the melt chamber 90 wherein hot water (180° F.) was sprayed on the ice to cause it to melt. Thereafter the melt was drained from the system through the vapor lock 94.

During the freeze drying operation, the vacuum pump 152 was operated to maintain a vacuum (i.e., on the order of 600 microns) sufficient to remove all noncondensable gases. The freeze dried coffee product was periodically discharged through the vapor lock 80 to the collection hopper 82, and from there was discharged through the vapor lock 84 for collection in suitable storage containers and subsequent packaging.

Many variations are possible in the processing herein described and in the arrangement and use of the disclosed system of apparatus. For example, although the disclosures relate to the freeze drying of solids-containing aqueous liquids, it is possible, with modifications, that the procedures and apparatus herein described could be adapted to the handling and freeze drying of solid particulate materials. It is also possible, in order to achieve a greater degree of control over the rate of freezing of the feed material, that additional cooling in the form of refrigerated gases might be employed, for example, jets of such gases directed downward from above the layer of material on the belt 12. It is additionally possible, in the classification of the frozen particles in the units 30, 32 and 34, that excessive quantities of "fines" (i.e., smaller than about 16 mesh) might be recycled to the entering feed 10 to achieve a blending and refreezing of these materials. Many other variations will similarly occur to those skilled in this art, and can easily be adapted to the disclosed continuous process and system of apparatus without changes in the overall concepts. Accordingly, it should be understood that the disclosures herein are intended as purely illustrative and not in any sense limiting.

We claim:

1. In a system for continuously freeze drying a solids-containing aqueous liquid, means rapidly and continuously freezing said liquid as a thin sheet of frozen material, said means comprising a continuous conveyor to which said beverage extract is fed and means chilling at least a portion of said conveyor to a temperature below about −40° F. so that freezing is accomplished within a period of the order of 8 to 15 minutes, means continuously breaking said thin sheet of frozen material to form discrete pieces of frozen material, a freeze drying chamber, means continuously conveying said discrete pieces of frozen material to said freeze drying chamber, vibratory conveyor means within said chamber forming a pathway for said discrete pieces of said frozen material, means for removing noncondensable gases from said chamber, condenser means adjacent said vibratory means, means supplying a refrigerating medium to said condenser means, means for cooling said vibratory conveyor means, means for supplying radiant energy to said discrete pieces of frozen material on said vibratory conveyor means, means for deicing said condenser means, means for continuously removing freeze dried material from said chamber, and means for removing ice discharged from said condenser means, said last named means including breaking means to reduce the size and thereby facilitate the removal of said ice.

2. A system of apparatus as in claim 1 wherein said means continuously feeding discrete pieces of frozen material to said freeze drying chamber includes a vapor lock, said vapor lock acting to maintain desired conditions of vacuum in said freeze drying chamber.

3. A system of apparatus as in claim 1 wherein said means for continuously removing freeze dried material from said chamber includes a vapor lock to maintain a desired degree of vacuum in said freeze drying chamber.

4. A system of apparatus as in claim 1 wherein said means to continuously discharge ice from said freeze drying chamber includes a vapor lock to maintain a desired degree of vacuum in said freeze drying chamber.

5. A system of apparatus for continuously freezing and subsequently freeze drying a solids-containing aqueous liquid, comprising: means feeding said liquid to the system, conveyor means receiving said liquid and forming the same into a thin layer, means for cooling said conveyor means to effect freezing of said liquid as a thin continuous layer of frozen material, means to remove said thin layer of frozen material from said conveyor means and to break the same into discrete pieces, a closed freeze drying chamber, means for maintaining a vacuum in said chamber, means continuously conveying said discrete pieces of frozen material to said freeze drying chamber, said last named means including a vapor lock to maintain the vacuum in said chamber, means for removing noncondensable gases from said chamber, vibratory conveyor means for moving said discrete pieces of frozen material through said freeze drying chamber, said vibratory conveyor means including pairs of vertically spaced conveying decks mounted in superimposed relationship within a tubular fluid conducting frame, said tubular frame being suspended within said freeze drying chamber, vibrating means including diametrically opposed eccentric means to oppositely vibrate said pairs of spaced conveying decks, drive means for said opposed eccentric means mounted exteriorly of said freeze drying chamber, said spaced conveying decks being supported within said tubular frame by flat springs providing a natural frequency of vibration equal to the frequency imparted to said spaced conveying decks by said vibrating means, means carried by each of said vertically spaced conveying decks to cool the same, said last named cooling means being in fluid communication through said tubular frame to a source of cooling medium, means continuously circulating cooling medium through said tubular frame to the cooling means in said spaced conveying decks, cryoplate condenser means mounted adjacent and on opposite sides of said vibratory conveying means, means continuously supplying a refrigerating medium to said cryoplate condensers, means carried by said tubular frame and said spaced conveying decks for supplying radiant energy to said pieces of frozen material moving on said vibratory conveying means, means for continuously discharging freeze dried material from said freeze drying chamber, means for periodically separating ice forming on said cryoplate condenser means, and means for periodically discharging said ice from said freeze drying chamber, said respective discharge means including vapor locks to maintain the vacuum in said freeze drying chamber.

6. In a continuous method of freezing and thereafter freeze drying solids-containing aqueous liquid, the simultaneous and progressive steps of rapidly and continuously freezing said liquid to form a thin continuous layer of frozen material, said freezing being carried out at least in part at temperatures below about −40° F. to insure completion of said continuous freezing steps within a period of the order of 8 to 15 minutes, continuously fracturing and breaking said layer of frozen material to form discrete individual pieces having a particle size less than about four mesh, continuously advancing said frozen pieces along a vibratory pathway in an evacuated substantially air free chamber, the rate of advance being such that the pieces remain within said chamber for a period within the range from about 25 to 90 minutes, continuously supplying energy to the frozen pieces to cause sublimation of the ice contained therein to water vapor, continuously cooling said vibratory pathway to a temperature below the freezing point of said frozen pieces, continuously maintaining a condenser surface in proximity to said vibrating pathway at a temperature within the range from about −50° to −100° F., continuously removing freeze dried material from said evacuated chamber, and periodically separating and removing from said evacuated chamber the ice which forms on said condenser surface.

7. A continuous method of freezing and thereafter freeze drying a solids-containing aqueous liquid comprising the steps of rapidly and continuously freezing said liquid as a thin continuous layer of frozen material, the rate of freezing said film being sufficient to accomplish said freezing step within a period of the order of 15 minutes or less, said layer of frozen material having a thickness within the range from one-sixteenth to one-half inch, continuously breaking said layer of frozen material to form discrete individual pieces of frozen material so that at least 80 percent is of a particle size less than about four mesh, continuously advancing the remaining frozen pieces along the vibrating pathway in an evacuated substantially airfree chamber, the rate of advance of said frozen pieces along said vibrating pathway being such that the particles are held within said chamber on said pathway for a period of 25 to not in excess of 90 minutes, continuously supplying energy to the frozen pieces moving on said vibrating pathway to cause sublimation of the ice contained therein to water vapor, said energy being supplied from above said vibrating pathway, continuously cooling said vibrating pathway to a temperature below the freezing point of said frozen pieces, continuously maintaining a condenser surface in proximity and adjacent the sides of said vibrating pathway, the temperature of said condenser surface being within the range from about −50° to −100° F., continuously removing freeze dried material from said vibrating pathway and from said evacuated chamber, and periodically separating the ice which forms on said condenser surface and removing the same from said evacuated chamber.

8. A method as in claim 7 wherein said freezing of said solids-containing aqueous liquid and the freeze drying of the broken and reduced frozen material obtained therefrom is continuously carried out within a period of from about 40 to 150 minutes.

9. In a system for continuously freeze drying a solids-containing aqueous liquid, means rapidly and continuously freezing said liquid as a thin sheet of frozen material, said means comprising a continuous conveyor to which said beverage extract is fed and means chilling at least a portion of said conveyor to a temperature below about −40° F. so that freezing is accomplished within a period of the order of 8 to 15 minutes, means continuously breaking said thin sheet of frozen material to form discrete pieces of frozen material, a freeze drying chamber, means continuously conveying said discrete pieces of frozen material to said freeze drying chamber, vibratory conveyor means within said chamber forming a pathway for said discrete pieces of said frozen material, said vibratory conveyor means comprising vertically spaced conveying decks mounted as a spring supported system within a suspended frame by means of flat springs, eccentric vibrator means adapted to vibrate pairs of said conveying decks in opposed vertical and horizontal relation with respect to one another to thereby cancel out the vibratory forces within said frame, and drive means for said eccentric vibrating means mounted exteriorly of said chamber, means for removing noncondensable gases from said chamber, condenser means adjacent said vibratory means, means supplying a refrigerating medium to said condenser means, means for cooling said vibratory conveyor means, means for supplying radiant energy to said discrete pieces of frozen material on said vibratory conveyor means, means for deicing said condenser means, means for continuously removing freeze dried material from said chamber, and means for removing ice discharged from said condenser means, said last named means including breaking means to reduce the size and thereby facilitate the removal of said ice.

10. A system of apparatus as in claim 8 wherein said drive means is operated to achieve a frequency of vibration of said spring supported system approximately equal to the natural frequency of vibration of said system.

11. In a system for continuously freeze drying a solids-containing aqueous liquid, means rapidly and continuously freezing said liquid as a thin sheet of frozen material, said means comprising a continuous conveyor to which said beverage extract is fed and means chilling at least a portion of said conveyor to a temperature below about −40° F. so that freezing is accomplished within a period of the order of 8 to 15 minutes, means continuously breaking said thin sheet of frozen material to form discrete pieces of frozen material, a freeze drying chamber, means continuously conveying said discrete pieces of frozen material to said freeze drying chamber, vibratory conveyor means within said chamber forming a pathway for said discrete pieces of said frozen material, said vibratory conveyor means comprising vertically spaced conveying decks mounted within a suspended frame, said suspended frame being formed of fluid conduit means adapted to conduct fluid therethrough to the means cooling said vibratory conveyor means, whereby any temperature changes effecting the length of the frame members will be substantially the same as those effecting the length of the vibratory conveyor means, means for removing noncondensable gases from said chamber, condenser means adjacent said vibratory means, means supplying a refrigerating medium to said condenser means, means for cooling said vibratory conveyor means, means for supplying radiant energy to said discrete pieces of frozen material on said vibratory conveyor means, means for deicing said condenser means, means for continuously removing freeze dried material from said chamber, and means for removing ice discharged from said condenser means, said last named means including breaking means to reduce the size and thereby facilitate the removal of said ice.

12. A system of apparatus as in claim 11 wherein the upper surface of said vertically spaced conveying decks are formed by means of plates affixed at one transverse edge of the conveying decks and freely supported at the other on an adjacent plate so as to facilitate a sliding length adjustment with temperature change.

13. In a system for continuously freeze drying a solids-containing aqueous liquid, means continuously freezing said liquid as a thin sheet of frozen material, means continuously breaking said thin sheet of frozen material to form discrete pieces of frozen material, a freeze drying chamber, means continuously conveying said discrete pieces of frozen material to said freeze drying chamber, vibratory conveyor means within said chamber forming a pathway for said discrete pieces of said frozen material, means for removing noncondensable gases from said chamber, condenser means adjacent said vibratory means, means supplying a refrigerating medium to said condenser means, means for cooling said vibratory conveyor means, means for supplying radiant energy to said discrete pieces of frozen material on said vibratory conveyor means, means for deicing said condenser means, means for continuously removing freeze dried material from said chamber, and means for removing ice discharged from said condenser means, said last named means including conveyor means on the bottom of said chamber to convey the separated ice to one end thereof, breaking means adjacent and below the end of said ice conveyor means, a melting chamber to receive broken ice from said breaking means, and means feeding hot liquid to said melting chamber to melt the ice for discharge from the system.

14. A system of apparatus as in claim 13 wherein vapor lock means are positioned between said breaking means and said melting chamber to assist in maintaining a desired degree of vacuum in said freeze drying chamber.

15. A rapid continuous method of freezing and thereafter freeze drying a solids-containing aqueous liquid comprising the steps of continuously freezing said liquid as a thin continuous layer of frozen material, said layer of frozen material having a thickness within the range from one-sixteenth to one-half inch, continuously breaking said layer of frozen material to form discrete individual pieces, continuously reducing the size of said discrete individual pieces of frozen material so that at least 80 percent is of a particle size less than about four mesh, removing all particles having a particle size greater than about four mesh, continuously recycling said removed particles to said step for continuously reducing the size of the discrete broken pieces, continuously advancing the remaining frozen pieces along the vibrating pathway in an evacuated substantially airfree chamber, the rate of advance of said frozen pieces along said vibrating pathway being such that the particles are held within said chamber on said pathway for a period of 25 to not in excess of 90 minutes, continuously supplying energy to the frozen pieces moving on said vibrating pathway to cause sublimation of the ice contained therein to water vapor, said energy being supplied from above said vibrating pathway, continuously cooling said vibrating pathway to a temperature below the freezing point of said frozen pieces, continuously maintaining a condenser surface in proximity and adjacent the sides of said vibrating pathway, the temperature of said condenser surface being within the range from about −50° to −100° F., continuously removing freeze dried material from said vibrating pathway and from said evacuated chamber, and periodically separating the ice which forms on said condenser surface and removing the same from said evacuated chamber.

* * * * *